United States Patent
Harvey

[15] 3,673,940
[45] July 4, 1972

[54] PRINT STRIPPING MECHANISM
[72] Inventor: Donald M. Harvey, Webster, N.Y.
[73] Assignee: Eastman Kodak Company, Rochester, N.Y.
[22] Filed: July 2, 1971
[21] Appl. No.: 159,323

[52] U.S. Cl. .................................................95/13, 95/29
[51] Int. Cl. ............................................................G03b 17/52
[58] Field of Search .....................95/13, 14, 89; 250/68, 69; 156/584; 96/29

[56] References Cited

UNITED STATES PATENTS

| | | | |
|---|---|---|---|
| 3,424,072 | 1/1969 | Hodgson et al. | 95/13 |
| 3,446,134 | 5/1969 | Brown et al. | 95/89 R |
| 3,494,273 | 2/1970 | Kampf et al. | 95/89 R |
| 3,559,554 | 2/1971 | Schmidt | 95/94 R X |
| 3,589,904 | 6/1971 | Chen | 95/13 X |

Primary Examiner—John M. Horan
Assistant Examiner—Alan A. Mathews
Attorney—W. H. J. Kline et al.

[57] ABSTRACT

A processing camera and print stripping mechanism for use with self-processing film units. The film units include an image-recording element separably coupled to a generally rigid carrier or frame. Grooves in the frame guide movement of camera stripper fingers between the image-recording element and the frame to separate the element from the frame as the film unit is moved endwise in the camera. The stripper fingers are pivotally mounted in the camera and include frame engaging surfaces or cams for producing relative lifting movement of the fingers to enhance their stripping action.

5 Claims, 12 Drawing Figures

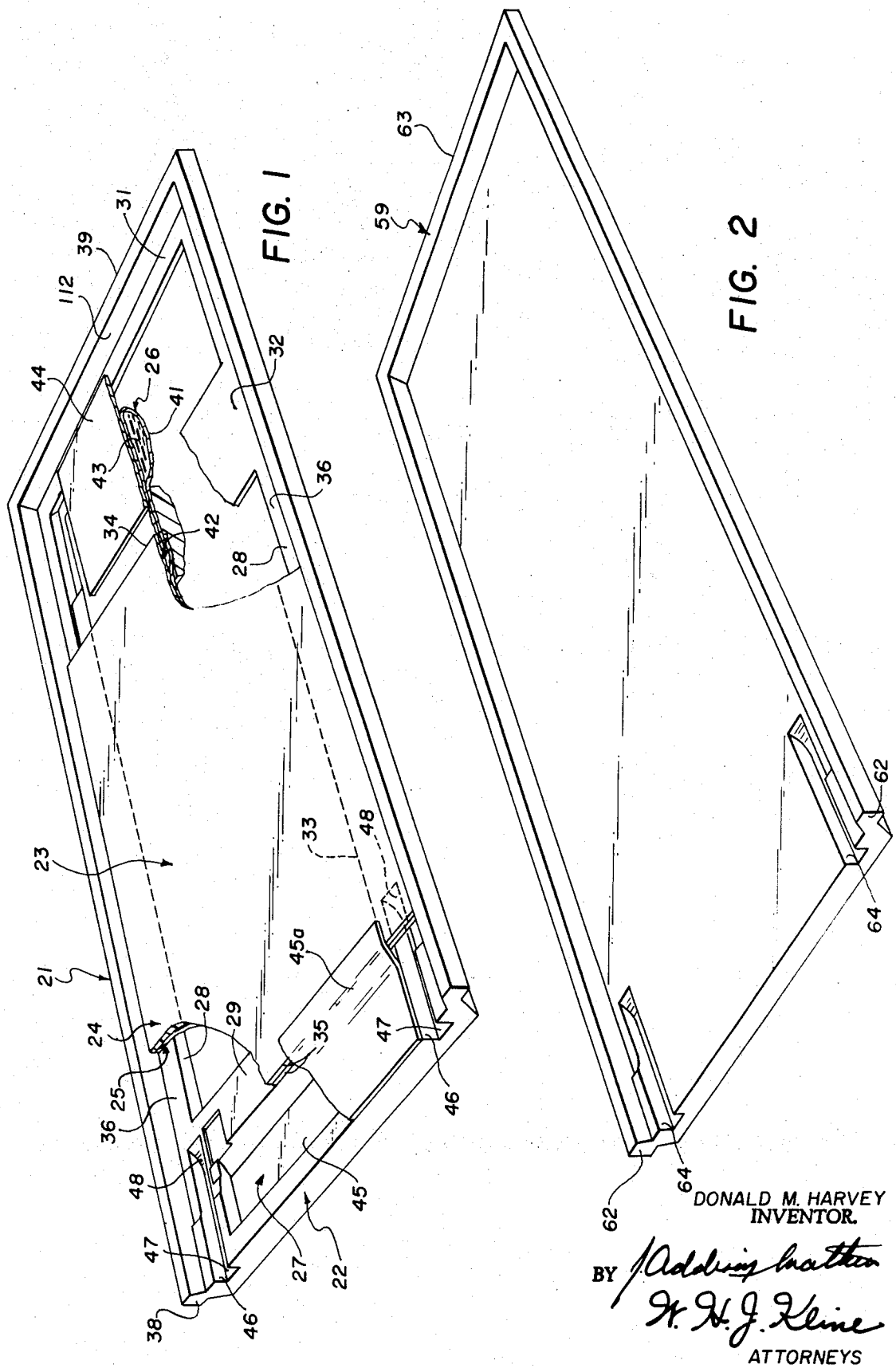

DONALD M. HARVEY
INVENTOR.

DONALD M. HARVEY
INVENTOR.

PRINT STRIPPING MECHANISM

BACKGROUND OF THE INVENTION

The present invention relates to processing cameras for use with self-processing film units, and more specifically to means for separating an image-recording element or print from such a film unit initially comprising the element strippably coupled to a carrier.

It is well known in the photographic arts to provide film units with materials for processing the units immediately after their exposure. Generally, such film units include an image-recording portion, defined by a photosensitive element and a process sheet or second element. The photosensitive element includes a support and one or more layers of radiation-sensitive material for recording a latent image, while the process sheet is adapted to be registered with the photosensitive element for aiding in the processing of that image. A viscous processing composition is supplied to the image-recording portion at one end and is spread toward the other end by passing the film unit between juxtaposed pressure-applying members that distribute the composition in a layer of predetermined thickness between the photosensitive element and the process sheet. The distributed composition then permeates the various layers to effect development of the latent image, as well as the construction of a visible image, usually on the process sheet. Examples of such film units in their most well known forms are disclosed in U.S. Pat. Nos. 3,080,805 and 3,511,659.

The present invention is most closely related to such film units having an image-recording portion of a "preregistered" and "integral" type. The photosensitive element and process sheet are superposed prior to exposure, and define a composite, permanently registered structure designed to remain substantially in the same physical form after processing. The second element is transparent to permit exposure of the radiation-sensitive materials from one side of the unit, and the image or print-receiving layer is located either in the process sheet, or, preferably, in the photosensitive element, to provide an image that need not be stripped from the rest of the unit. Specific details of this latter type of film unit are disclosed, for example, in commonly assigned U.S. Patent Application Ser. No. 027,990 entitled PHOTOGRAPHIC FILM UNIT FOR DIFFUSION TRANSFER PROCESSING, filed Apr. 13, 1970 in the name of H.E. Cole and now abandoned, and in French Pat. Nos. 2,006,255 and 2,006,256 published Dec. 26, 1969.

To facilitate their handling and manipulation, image-recording portions of the type just described can be removably attached to a substantially rigid plastic carrier or frame, that also carries a processing fluid container or pod, and an excess fluid collector or trap. The image-recording portion is releasably or strippably coupled to the frame, while the pod and trap are permanently attached thereto, in a manner permitting removal of the image-recording portion from the other elements of the film unit after the initiation of the processing. For purposes of the present disclosure, this separated image-recording portion often is referred to as a print or print unit, although a visible image may not be apparent immediately after separation.

To separate the finished print from the frame, it has been proposed previously to provide the frame with grooves or slots which extend along its lateral edges in confronting relation to the marginal surfaces of the print. The film unit is moved endwise along a predetermined path, and rigidly mounted skiving or stripper fingers in the camera enter those grooves to wedge the leading end of the print out of engagement with the frame. For purposes of the present disclosure, it will be understood that the terms "leading end" and "trailing end" refer respectively to those ends of the film unit or image-recording unit that are first and last to encounter the stripping device, regardless of the direction of movement of the film unit during the processing or print separating operations. After the fingers have entered between the print and the frame, continued movement of the film unit causes the separated end of the print to be directed through a slot or door in the camera housing. Examples of such a film unit and of the aforementioned type of stripper or skiving fingers are disclosed in commonly assigned U.S. Patent Application Ser. No. 111,472 entitled STRIPPING MECHANISM filed in the name of D. M. Harvey on Feb. 1, 1971.

Improvements in stripping mechanisms of the type described above are disclosed in commonly assigned copending U.S. Patent Application Ser. No. 159,322 entitled FILM UNIT AND APPARATUS FOR USE THEREWITH and filed in the name of G. E. Kindig on even date herewith. In accordance with that disclosure, grooves in the frame terminate slightly beyond the leading end of the image-recording portion where they are provided with sloping base surfaces that are adapted to be engaged by the stripper fingers to cam the fingers out of the grooves, thereby enhancing the stripping operation. This relative movement between the fingers and the frame can be accommodated either by providing movable spring loaded fingers that are displaced relative to the camera, or by using rigidly mounted fingers that displace the frame in opposition to resilient means defining its endwise movement path. While such mechanisms operate satisfactorily for their intended purposes, the camming force is developed at the leading ends of the fingers, which can therefore be subjected to significant wear and to the danger of bending or breaking, especially if the fingers are formed in plastic. Furthermore, because the cam surfaces of the frame are located within the grooves, the maximum print separating displacement between the fingers and the frame ordinarily cannot exceed the relatively shallow depth of the grooves.

SUMMARY OF THE INVENTION

Principle objects of the present invention are to improve the structural integrity and the longevity of a stripping device of the general types described above, while simultaneously affording greater print separating movement between the stripper and the print carrier.

Briefly, these and other related objectives are accomplished in accordance with a preferred embodiment of the present invention by employing camming surfaces on the stripper that are adapted to be engaged by the film unit to provide or enhance relative print separating movement between the film unit carrier or frame and the stripper in response to endwise movement of the carrier or frame in the camera. In one embodiment of the invention, the stripper is pivotally mounted and includes a cam member that engages the leading end of the frame, to pivot the stripper away from the frame in properly timed relation to the endwise movement of the frame. Another embodiment of the invention employs a rigidly supported stripper and provides that stripper or another portion of the camera with camming surfaces that engage the leading edge of the moving frame to displace it away from the stripper in proper timed relation to movement of the frame.

Various means for practicing the invention and other advantages and novel features thereof will be apparent from the following detailed description of illustrative preferred and alternative embodiments of the invention, reference being made to the accompanying drawings in which like reference numerals denote like elements.

BRIEF DESCRIPTION OF THE DRAWINGS

FIG. 1 is a perspective view of the reverse face of an integral preregistered film unit of the type with which the present invention is concerned;

FIG. 2 is a perspective view of the reverse face of a cover plate used in conjunction with a plurality of film units of the type shown in FIG. 1, to provide a film unit assemblage;

DESCRIPTION OF THE PREFERRED EMBODIMENT

Figure 3:
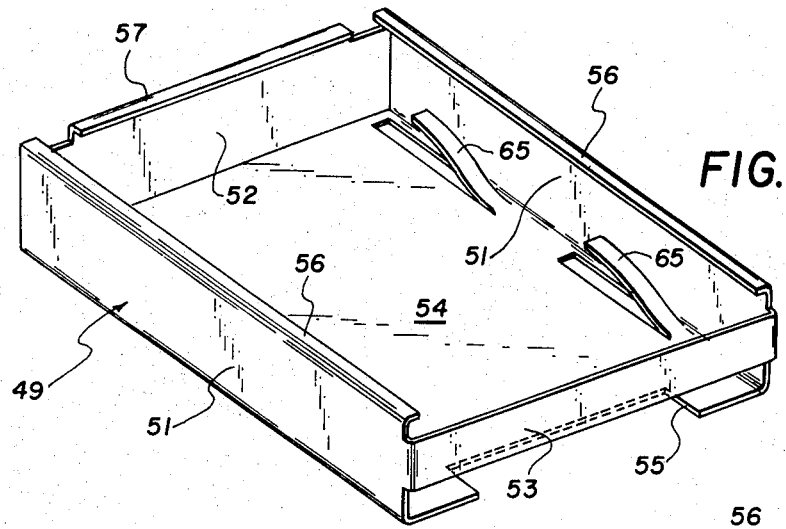
FIG. 3 is a perspective view of a film pack casing adapted to receive a film unit assemblage comprising a plurality of the film units and cover plates shown in FIGS. 1 and 2.

Because processing cameras and film units are well known, the present description will be directed in particular to elements forming part of or cooperating directly with the present invention. Elements not specifically shown or described here should be understood as being selectable from those known to persons skilled in the art.

By reference to FIG. 1 of the drawings a typical preregistered and integral film unit 21 of the type described above will be seen to comprise a frame 22; an image-recording portion or unit 23 including a rearward photosensitive sheet 24 and a forward process sheet 25; a processing fluid container or pod 26; and an excess fluid collector or trap 27. As previously mentioned, the image-recording unit is exposed from its forward side, through the transparent process sheet, but the finished print is viewed from the rearward face of the photosensitive sheet depicted in FIG. 1. The frame 22 is preferably made of an opaque generally rigid (but slightly flexible) plastic material, and includes two side rails 28 joined at one end by a trap bar 29. At the opposite end, the side rails are connected by an end or pod support bar 31 and by a cross bar 32.

As described in greater detail in the aforementioned U.S. Patent Application Ser. No. 111,472, the two sheets 24 and 25 of the image-recording unit preferably are rectangular and coextensive with one another and can be maintained in registered or superposed facing relation by any appropriate edge seal or connection. Regardless of the particular type of edge seal or connection or its manner of application, the two sheets are secured substantially in direct contacting relation to each other along their lateral marginal edges in such a manner that the central exposure areas of the sheets, depicted between broken lines 33 in FIG. 1, are retained in registered overlying relation but may be spread apart sufficiently to permit the distribution of a processing composition therebetween. Similarly the two sheets are resiliently separable from one another to permit the introduction of the processing composition between their pod ends 34 and the collection of excess processing composition from between their trap ends 35.

As shown at numeral 36, the side rails of the frame provide flat rearwardly-facing mounting surfaces lying substantially in a single plane for supporting the marginal edges of the image-recording unit and to which such marginal edges are separably secured, preferably by a rupturable adhesive material. Beyond the lateral edges of the image-recording unit, edge ribs 38 extend rearwardly from the frame and are joined at the pod end by a similar end rib 39. As described in detail below, these ribs serve as light barriers when a plurality of film units are assembled into an assemblage and also perform guiding functions as subsequent film units are removed from and replaced into such an assemblage.

The fluid processing pod 26 may include various cooperating parts which define a suitable processing composition supplying mechanism, and preferably includes a rupturable containing part 41 comprising a rectangular piece of vapor impervious material that is folded along one edge and sealed along its lateral sides. The discharge end 42 of the pod, sometimes referred to as a funnel, is inserted between the adjacent ends of the photosensitive and process sheets. A rupturable seal is provided along substantially the entire length of the discharge end of the pod and is adapted to release a processing fluid composition 43 from the container upon the application of hydraulic forces generated by passing the pod between a pair of juxtaposed pressure applying members, as described below. The fluid containing part of the fluid supply mechanism is permanently cemented to a cardboard shim 44 which, in turn, is permanently attached to the film unit frame.

The trap bar 29 is provided with a shallow forwardly facing trap or collector recess 45. The leading edge of the vapor impermeable cover sheet 45a overlies the adjacent end of the image-recording unit and the other three edges of sheet 45a are cemented or otherwise permanently attached to the frame adjacent recess 45. Excess processing fluid extruded out of the trap end of the image-recording unit is therefore received and stored in the collector chamber or trap covered by sheet 45a.

The trap cover sheet 45a does not extend the full width of the image-recording unit but only slightly past the edges of the exposure area or separable interface between the photosensitive and process sheets, which is approximately the same width as trap recess 45. Beyond the lateral edges of the cover sheet, the frame is provided with a pair of stripper finger grooves 46 which are overlapped by the corners of the trap end of the image-recording unit releasably bonded to the frame. These grooves are open to the corresponding end of the frame and their base surfaces 47 are provided at their blind ends with curved or sloping end portions 48 behind the overlapping corners of the image-recording unit. Analogous stripping finger grooves are also provided in the film unit disclosed in the aforementioned U.S. Patent Application Ser. No. 111,472, but it is important to note that those grooves extend the full length of the image-recording unit whereas the grooves 46 terminate a short distance beyond the the trap end of the image-recording unit. It should be understood also that the dimensions of various features of the illustrative film unit have been exaggerated in the drawings for purposes of clarity and that these grooves are relatively narrower and shallower in an actual film unit than in the illustrations.

The film units described above are preferably supplied in a film pack comprising a plurality of such units loaded into a film-pack casing 49 best shown in FIG. 3. The casing is made of plastic or sheet metal and comprises side walls 51, a full end wall 52, an opposite partial end wall 53 and a rearward wall 54 provided with a rectangular opening 55 adjacent wall 53. Lateral retaining lips 56 project inwardly from the forward edges of the side walls and a similar end retaining lip 57 likewise projects inwardly from the forward edge of end wall 52.

Figure 4:
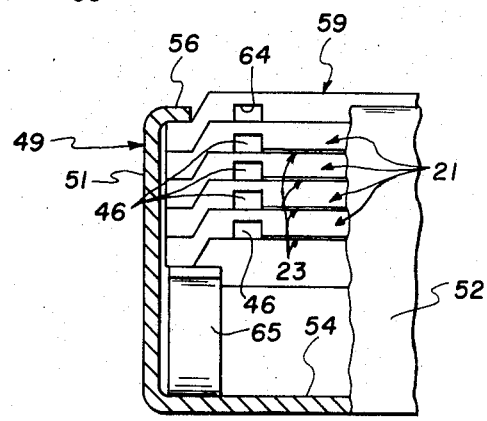
FIG. 4 is a fragmentary partially cross-sectioned end view of a fully loaded film pack comprising the components shown in FIGS. 1 through 3.

FIG. 4 illustrates a fully loaded film pack, which is depicted as comprising a film unit assemblage including a plurality of film units 21 initially protected by a cover plate 59. The cover plate is of the same exterior dimensions as the film units and includes similar edge ribs 62 and end ribs 63, best shown in FIG. 2. As illustrated in FIG. 4, the edge and end ribs of the cover plates and the film units cooperate in an overlapping or labyrinth manner to make the film unit assemblage substantially light-tight except along its trap end, which is protected from light by confronting against the inner face of casing end wall 52. For reasons explained below, the cover plate is also provided with stripper finger grooves 64 which correspond to those in the film unit frames. Four leaf springs 65 are formed integrally with the rearward wall 54 of the film pack casing and bias the film unit assemblage forwardly into contact with retaining lips 56 and 57. Because partial end wall 53 is narrower in a forward to rearward direction than the film pack casing, it will be seen that the forwardmost element of the film unit assemblage can be slid out of that end of the film pack casing and can be returned to the casing at the rear of the assemblage by being inserted into the casing opening between partial end wall 53 and rearward wall 54.

Figure 5:
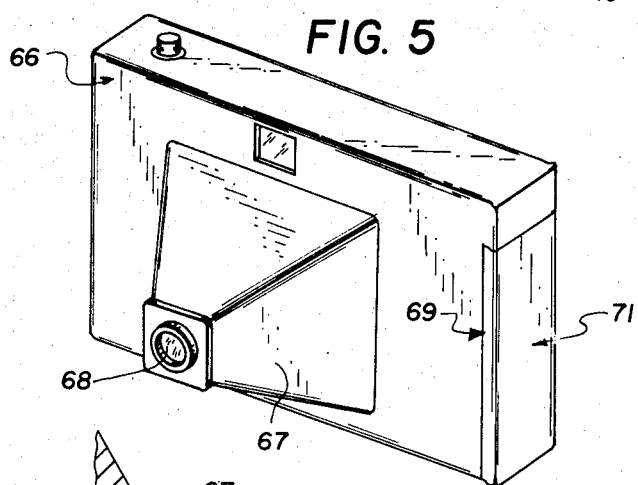
FIG. 5 is a perspective view of an illustrative camera embodying a preferred embodiment of the present invention.
Figure 6:
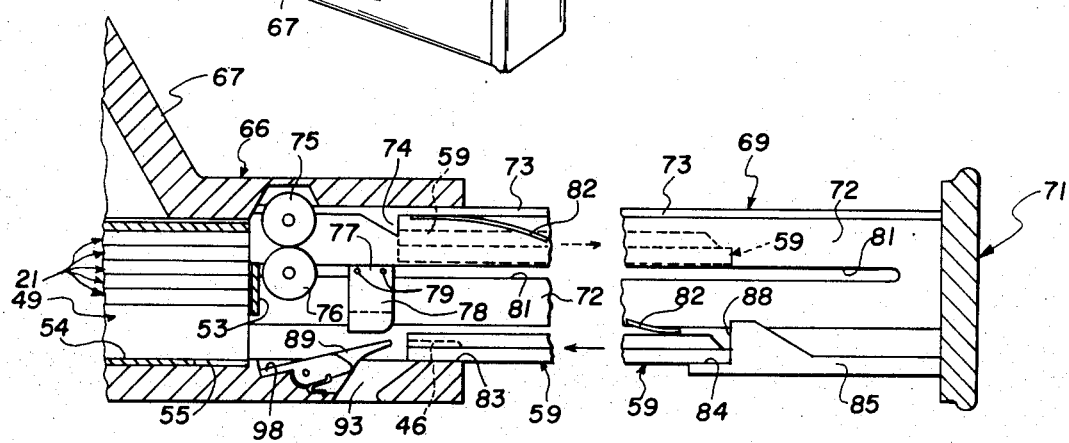
FIG. 6 is a somewhat schematic cross-sectional view of the camera of FIG. 5 with certain components thereof shown in a moved position.

By reference to FIG. 5, the illustrative camera will be seen to comprise a rectangular housing 66 provided with a rigid forwardly extending enclosure 67 that supports the camera lens 68 and an appropriate shutter and diaphragm mechanism, not shown. When the film pack is loaded into the camera, it is accurately positioned within housing 66 so that the photosensitive sheet of a film unit seated against the film pack casing lips 56 and 57 is coincident with a focal plane of the camera lens. A drawer or frame transporter 69 is slidably mounted within the camera housing and can be reciprocated manually by means of its accessible end wall 71 to move it between the closed position shown in FIG. 5 and the open position shown in FIG. 6. For purposes of the present disclosure, it will suffice to understand that the drawer 69 includes a pair of opposed side bars 72 that straddle the film pack casing, one of such bars being depicted in FIG. 6. Each side bar, in turn, includes a rib 73 that lies forwardly of the corresponding film pack casing lip 56 and that carries a hook 74. When the drawer is in its fully closed position, hooks 74 are received between the corresponding ends of casing end wall lip 57 and the lateral casing lips 56 and are engageable with the adjacent end edge of the forwardmost element of the film unit assemblage. As the drawer is pulled to its open position, hooks 74 push that element out of the film pack casing and between a pair of opposed pressure rollers 75 and 76 that are biased toward each other by resilient spring means, not shown. When the trap end of the moving film assemblage element engaged by hooks 74 has passed beyond the pressure rollers, it is supported temporarily by the forward face 77 of stripper guide bar 78, which is mounted to the camera housing by pins 79 extending through slots 81 in the drawer side bars. The guide bar therefore maintains the trap end of the moving element in engagement with hooks 74 until just before the drawer has reached its fully open position.

Figure 7:
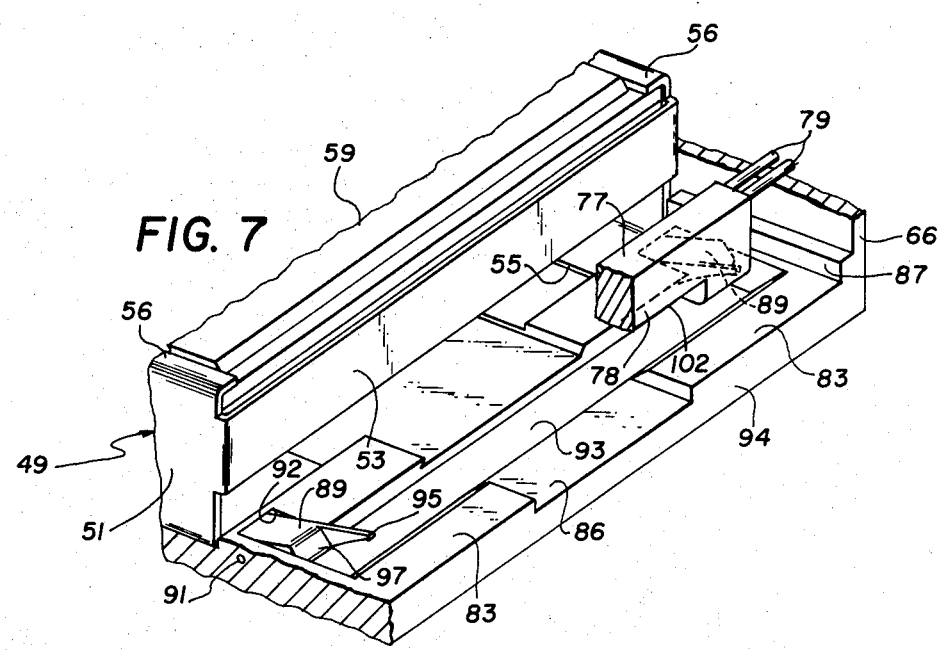
FIG. 7 is a fragmentary perspective view of the illustrative camera illustrating a preferred embodiment of the film stripping device to which the present invention is specifically directed.

A light leaf spring 82 is attached to the rearward surface of each drawer bar rib 73 and is compressed between that rib and the corresponding casing lip 56 when the drawer is closed. During the opening movement of the drawer, springs 82 engage the front margins of the moving film assemblage element and urge it rearwardly with a light resilient force. When the drawer has reached its open position, the film assemblage element is beyond supported engagement with guide bar 78, as shown in broken lines at numeral 59 in FIG. 6. Accordingly, it can then be moved rearwardly by springs 82 so that its trap end rests on rearward guide surfaces 83 of the camera housing and its pod end rests on support surface 84 of the partial rearward drawer wall 85. As shown in FIG. 7, surfaces 83 of the camera housing are located at opposite sides of a slot 86 that accommodates the partial drawer wall 85 and are straddled by converging lateral guide surfaces 87. In its rearward position just described, the film assemblage element is therefore in endwise alignment with the opening between the partial casing end wall 53 and the rearward casing wall 54. During the closing movement of the drawer, shoulder 88 of drawer wall 85 therefore pushes the film assemblage element into the rearward compartment of the film pack casing, whereupon springs 65 bias it forwardly into stacked engagement with the other elements of the film unit assemblage. The closing of the drawer also returns hooks 74 to their initial position adjacent the trap end of the film unit element then seated against the forward casing ribs. Accordingly, it will be apparent that repetitive opening and closing movement of the drawer will cause each element of the film unit assemblage, in turn, to be removed from its forwardmost position in the film pack and returned to the rear of the film unit assemblage.

Figure 8:
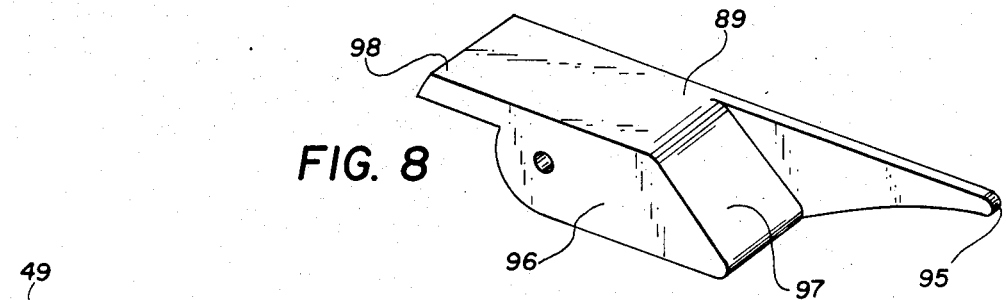
FIG. 8 is a perspective view of one of the stripper fingers used in the embodiment of the invention shown in FIGS. 6 and 7.
Figure 9:
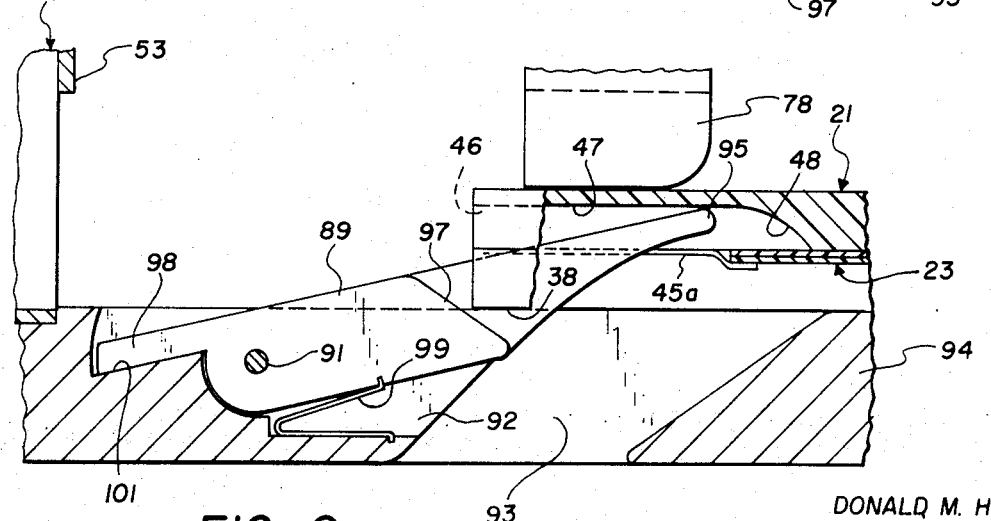
FIGS. 9 and 10 are enlarged cross-sectional views showing the operation of the film stripping device depicted in FIGS. 6, 7 and 8.
Figure 10:
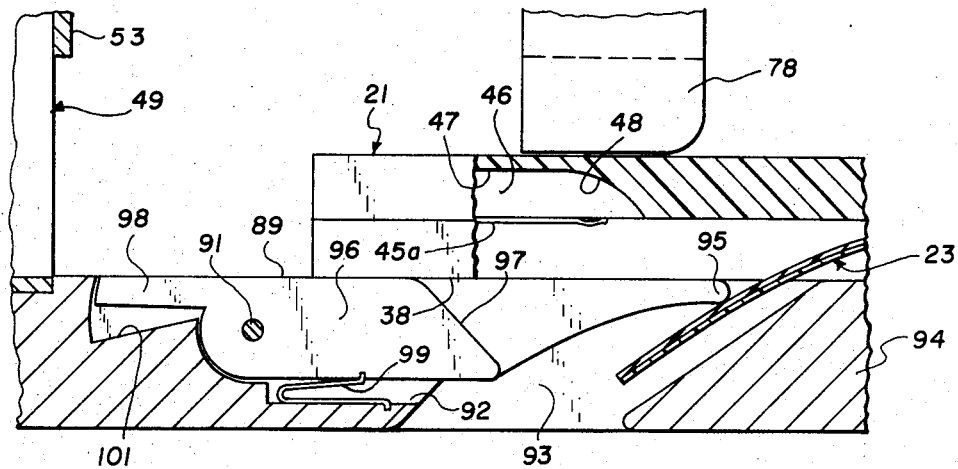

The stripper finger construction shown in FIG. 6 through 10 comprises a pair of movable stripper fingers 89, which are pivotally attached to the camera housing by pivot pins 91 in respective openings 92 joining a sloping print removal slot 93 in the rearward camera wall 94. The two stripper fingers are mirror-image duplicates of each other and, as shown in FIG. 8, each finger includes a pointed tip 95, a lateral cam boss 96 provided with a sloping cam surface 97, and a positioning ear 98. A weak leaf spring 99 is compressed behind each stripper finger and resiliently biases the finger forwardly to its extended position, shown in FIGS. 6, 7 and 9, which is defined by the abutment of ear 98 against surface 101 of the corresponding opening 92. When both fingers are in that position, their respective tips are aligned with the stripper finger grooves in the film assemblage element being returned to the film pack and are adapted to enter those grooves at the open ends thereof. The stripper guide bar 78 maintains the returning film assemblage element in contact with the coplanar camera guide surface 83 so that the tips of the stripper fingers enter the stripper finger grooves closely adjacent the base surfaces 47 thereof.

During the initial opening and closing movement of the drawer, which removes the forward cover plate from the film pack and replaces it at the back of the film unit assemblage, neither the pressure rollers nor the stripper fingers are required to perform any operative function. If the cover plate were not provided with stripper finger grooves 64, however, the square leading or trap edge of that plate would abut against the tips of the stripper fingers during the return movement of the plate, which would either block that movement or bend the fingers. By including the stripper finger grooves 64 in the cover plate, the fingers enter those grooves in the same manner described below in connection with the print stripping operation and are cammed to a retracted position to allow the cover plate to move past the stripping mechanism without damaging the latter. As illustrated in FIG. 7, the guide bar 78 is provided with a notch 102 that accommodates shoulder 88 of the partial drawer wall as the closing movement of the drawer pushes the cover plate all the way into the film pack casing.

When the endwise movement of the film unit has caused the tips of the stripper fingers to enter the blind ends of the stripper finger grooves overlapped by the corresponding corners of the print, the leading edges of the frame edge ribs 38 encounter the sloped surfaces 97 of cam bosses 96 on the respective fingers. Because the frame is prevented from moving forwardly by guide bar 78, its continuing endwise movement causes the frame edge ribs 38 to cam the fingers rearwardly to the retracted position shown in FIG. 10. This rearward movement of the stripper fingers withdraws them from the stripper finger grooves and thereby causes abrupt and positive separation of the leading corners of the print from the frame. The freed leading end of the print is guided into print removal slot 93 by the stripper fingers, which remain in contact with the margins of the print facing the frame and wedge the print free of the frame as the movement of the latter continues. If desired, transverse stiffening means can be provided at the leading edge of the print to further ensure its proper separation from the frame and a resilient cover door can be provided over camera housing slot 93 to temporarily grip the trailing end of the separated print and prevent it from falling to the ground. After the movement of the film unit has caused the print to be completely separated from the frame, the stripper fingers remain retracted until the frame has moved entirely past cam surfaces 97, thus allowing the tips of the fingers to clear end rib 39 of the frame.

DESCRIPTION OF AN ALTERNATIVE EMBODIMENT

Figure 11:
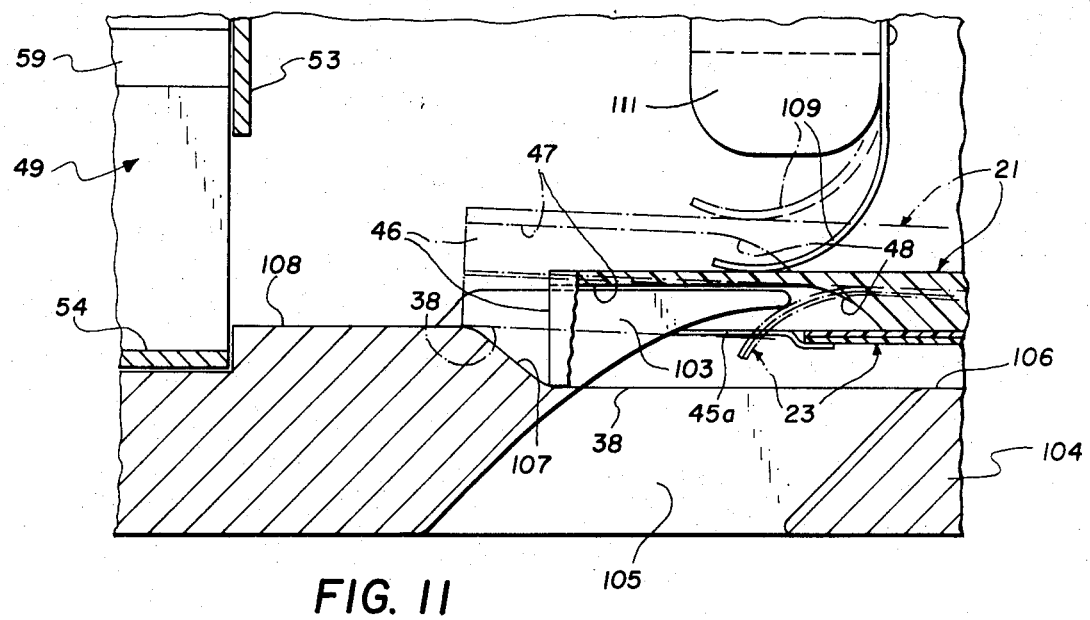
FIGS. 11 and 12 correspond generally to FIGS. 9 and 10 but illustrate the operation of an alternate embodiment of the invention in which the stripper fingers are immovable relative to the camera.
Figure 12:
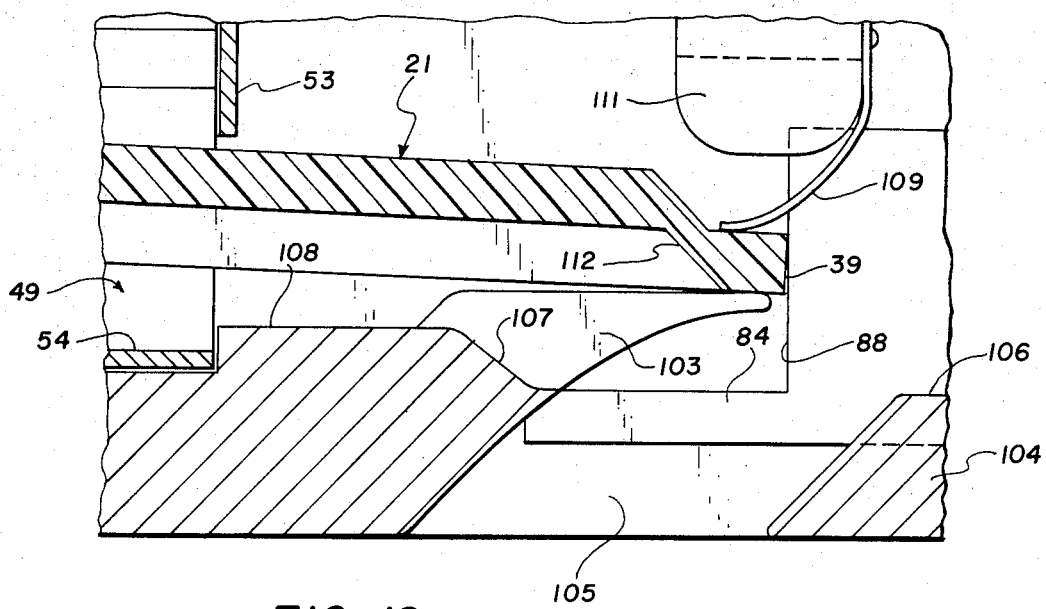

The embodiment of the invention shown in FIGS. 11 and 12 comprises a camera corresponding generally to the one heretofore described but in which the stripper fingers 103 are rigidly attached to or formed as an integral part of back wall 104 of the camera housing adjacent print removal opening 105. The film unit 21 is identical to the one shown in the preceeding figures and its various illustrated features are identified by the same reference numerals used in those figures. Rearward guide surfaces 106 on the back wall of the camera housing correspond to surfaces 83 shown in FIG. 7, but are disposed slightly rearwardly of the inner surface of the rearward film pack casing wall 54. Adjacent the stripper fingers, forwardly sloping cam surfaces 107 join rearward guide surfaces 106 with forward guide surfaces 108 which are aligned with the opening to the rearward chamber of the film pack casing.

As the film unit approaches the stripper fingers during the closing movement of the drawer, it is urged rearwardly against surfaces 106 by a pair of relatively weak leaf springs 109 engaged with the marginal forward faces of the film unit frame. These springs are carried by a guide bar 111 that is similar to guide bar 78 except that it does not directly engage the film unit being returned to the film pack casing. Because the stripper fingers are immovably located with respect to guide surfaces 106, the location of the tips of the rigidly mounted fingers relative to frame grooves 46 can be established permanently with a high degree of accuracy.

Just before the endwise movement of the film unit has brought the sloped end portions of grooves 46 into contact with the tips of stripper fingers 103, the leading or trap ends of the film unit edge ribs 38 encounter the respective cam surfaces 107 as shown in solid lines in FIG. 11 and are thereby cammed forwardly in opposition to springs 109 as shown in broken lines in that same figure. This forward movement of the leading end of the frame provides the initial separation of the leading end of the print from the frame and brings the latter into supported contact with surfaces 108, which guide it into the rearward chamber of the film pack casing as the closing movement of the drawer proceeds. During such further movement of the film unit, the stripper fingers wedge the margins of the print out of engagement with the confronting frame surfaces in the same general manner previously described. After the print has been completely separated from the frame, the sloped inner face 112 of end rib 39 engages the tips of the stripper fingers and cams the trailing end of the frame forwardly to allow rib 39 to pass the stripper fingers during the final closing movement of the drawer. Because the print separating operation has been completed, the only force imparted to the stripper fingers by this camming action is that required to overcome the relatively weak opposition of springs 109, which are not strong enough to cause damage to the fingers.

The invention has been described in detail with particular reference to illustrative preferred and alternative embodiments thereof, but it will be understood that variations and modifications can be effected within the spirit and scope of the invention.

I claim

1. Photographic apparatus for use with a self-processing film unit, the film unit including an image-recording element strippably coupled to a carrier, said apparatus comprising:
   a transporting mechanism for moving the film unit in a movement path relative to said apparatus; and
   a stripping mechanism for separating the image-recording element from the carrier upon movement of the film unit in said path, said stripping mechanism including a stripping member for entering between the element and the carrier, to effect stripping of the element from the carrier, and means defining a camming surface in said path for engaging the carrier and effecting relative movement between said member and the carrier away from each other to accentuate said stripping.

2. The invention claimed in claim 1 wherein said stripping member is movably mounted in said apparatus, and wherein said camming surface cams said member in a direction away from the carrier.

3. The invention claimed in claim 1 wherein said stripping member is fixed relative to said apparatus, said apparatus including means for resiliently biasing the carrier toward said member and for permitting movement of the carrier in a direction away from said member.

4. In a processing camera adapted to expose and to initiate processing of a film unit, the film unit including a substantially rectangular image-recording portion defining leading and trailing ends and lateral margins, a generally rigid frame defining leading and trailing ends, lateral edges, and a pair of grooves open to the leading end of the frame and extending parallel to the lateral edges, and means separably coupling the lateral margins of the image-recording portion to the lateral edges of the frame with the leading end of the image-recording portion spaced from the leading end of the frame and overlying the grooves, an improvement in means for initiating separation of the image-recording portion from the frame, said improvement comprising:
   guide means defined by said camera for guiding initial movement and then further movement of the film unit along a movement path;
   a pair of stripper members pivotally mounted to said camera and provided with stripper fingers, said stripper members being movable between respective first positions, at which said fingers extend into said movement path for entering corresponding ones of the grooves at the leading end of the frame so as to be guided between the image-recording portion and the frame during said initial movement of the film unit along said movement path, and respective second positions, at which said fingers are retracted from said movement path for removing the fingers from the grooves during said further movement of the film unit along said movement path;
   resilient means for biasing said stripper members toward said first positions; and
   cam means carried by said stripper members, said cam means, when said stripper members are in said first positions, extending into said movement path and being engageable with the frame to initiate the separation of the image-recording portion from the frame by camming said stripper members from said first positions to said second positions in response to said initial and further movements of the film unit after said fingers have entered the grooves so as to be guided between the image-recording portion and the frame.

5. In a processing camera adapted to expose and to initiate processing of a film unit, the film unit including a substantially rectangular image-recording portion defining leading and trailing ends and lateral margins, a generally rigid frame defining leading and trailing ends, lateral edges, and a pair of grooves open to the leading end of the frame and extending parallel to the lateral edges, and means separably coupling the lateral margins of the image-recording portion to the lateral edges of the frame with the leading end of the image-recording portion spaced from the leading end of the frame and overlying the grooves, an improvement in means for initiating separation of the image-recording portion from the frame, said improvement comprising:
   first guide means defined by said camera for guiding movement of the film unit along a predetermined plane relative to said camera;
   resilient means for yieldably retaining the film unit in engagement with said first guide means;
   a pair of stripper fingers mounted to said camera in fixed relation to said first guide means, said stripper fingers including pointed tips extending to said plane for entering corresponding ones of the grooves at the leading end of the frame during said movement of the film unit; and
   second guide means defined by said camera and extending to said plane for engaging the frame and directing the frame away from said first guide means to accentuate separation of the leading end of the image-recording portion from the frame.

* * * * *